United States Patent
Jakob et al.

(10) Patent No.: US 6,309,132 B1
(45) Date of Patent: Oct. 30, 2001

(54) FASTENING ASSEMBLY FOR FASTENING A FIRST MEMBER TO A SECOND MEMBER

(75) Inventors: Andreas Jakob, Hemer; Lothar Brehmer, Raunheim, both of (DE)

(73) Assignee: ITW-Automotive Products GmbH & Company KG, Iserlohn (DE)

( * ) Notice: Subject to any disclaimer, the term of this patent is extended or adjusted under 35 U.S.C. 154(b) by 0 days.

(21) Appl. No.: 09/136,316

(22) Filed: Aug. 19, 1998

(51) Int. Cl.$^7$ .................................................. F16B 9/00
(52) U.S. Cl. .................. 403/200; 403/353; 403/408.1; 403/230; 403/233; 403/240; 403/6; 403/7; 411/410; 411/402; 411/304; 411/411; 411/302; 411/301; 280/728.1; 280/735
(58) Field of Search ................................ 403/200, 353, 403/408.1, 230, 233, 240, 263, 6, 7; 411/410, 402, 411; 280/728.2, 755

(56) References Cited

U.S. PATENT DOCUMENTS

| | | | |
|---|---|---|---|
| 4,104,446 | * 8/1978 | Johnson | 428/585 X |
| 4,753,560 | * 6/1988 | Ryder | 411/82 X |
| 5,080,188 | * 1/1992 | Okuhara et al. | 180/735 X |
| 5,143,331 | * 9/1992 | Robert | 403/254 X |
| 5,356,254 | * 10/1994 | DiMaio et al. | 411/302 X |
| 5,451,074 | * 9/1995 | Guitarini | 280/728.3 X |
| 5,730,465 | * 3/1998 | Barton et al. | 280/775 X |

FOREIGN PATENT DOCUMENTS

| | | | |
|---|---|---|---|
| 0007397 | * 2/1980 | (EP) | 403/353 |
| 1567050 | * 5/1980 | (GB) | 403/408 |

* cited by examiner

*Primary Examiner*—Lynne H. Browne
*Assistant Examiner*—Ernesto Garcia
(74) *Attorney, Agent, or Firm*—Schwartz & Weinrieb

(57) ABSTRACT

A fastening assembly for fastening a first member to a second member comprising

- at least one threaded fastener having a head at one end thereof, the head having engagement surfaces for a tool, a threaded shank, the other end of the shank having engagement surfaces for a tool,
- at least one receiving bore in the first member into which the threaded shank is threaded in a pre-mounted state from one end thereof, with the head being spaced from the associated surface of the first member,
- the second member being preferably of thin sheet material and having at least one elongated opening, the opening having a first portion adapted to allow the entrance of head and a smaller portion adapted to accommodate the shank while the head grips behind the edge of the opening.

20 Claims, 1 Drawing Sheet

FASTENING ASSEMBLY FOR FASTENING A FIRST MEMBER TO A SECOND MEMBER

FIELD OF THE INVENTION

The present invention relates generally to a fastening assembly for fastening a first member to a second member, and more particularly to a fastening assembly wherein the fastener elements are disposed within a recessed mode so as not to protrude from the members being fastened together.

BACKGROUND OF THE INVENTION

When fastening a sensor, such as, for example, a sensor for an airbag, it is required that the fastener means, that is, one or a plurality of threaded fasteners must not project beyond the sensor, otherwise the danger is to be seen that the safety belt which is attached to a column of the car body contacts the end of a solid fastener and thus may be damaged. A fastening of such a housing from the opposite side normally is not possible as the hollow column does not admit access to the interior thereof.

SUMMARY OF THE INVENTION

The present invention provides a fastening assembly comprising a member to be fastened, in particular a housing for a sensor, and a support member which allows a safe and extremely simple and quick fastening of the members together without leaving unnecessarily protruding parts.

The fastening assembly according to the present invention provides a threaded fastener which is accommodated within a through-bore of the first member, such as, for example, a sensor housing. The threaded fastener has a head at one end thereof which may be additionally formed with a flange portion serving as a washer. The threaded shank of the fastener is accommodated within an inner thread of the bore and has engagement surfaces for a tool at the free end thereof, such as, for example, a so-called Torx-portion. The second member which is preferably of thin sheet material, such as, for example, a column of the body of an automobile, has an opening or a hole which comprises two portions, namely a larger portion allowing the passage of the fastener head and a smaller sized portion which allows the head to grip behind the edge of the hole defining the smaller sized portion while contemporarily accommodating the fastener shank. The fastener is pre-assembled in the first member such that the head is spaced from the associated surface of the first member. According to an embodiment of the invention, the fastener shank can be threaded into an insert which for example forms an interference fit with the bore. If, however, the first member is of metallic material in the area of the bore, the bore can be provided with an inner thread. In any case it is appropriate if the thread of the shank has an adhering portion by which the threaded fastener is held in the pre-position. With the pre-mounted threaded fastener the first member is then brought into engagement with the support member, with the head being introduced through the larger portion of the hole. Thereafter, the first member is displaced along the outer surface of the support member so that the head grips behind the edge of the hole, and the shank enters the smaller portion thereof. Now, the threaded fastener can be tightened in that the tool engages the end of the shank. When tightened the head of the fastener engages the inner side of the sheet material of the support member. It is understood that the threading movement at the end of the shank is opposite to that at the end of the head. As most screw drivers normally are turning right-hand, it is recommended according to an embodiment of the invention to provide the threaded shank with a left hand thread. For the pre-assembling in this case a driver is necessary which turns left hand.

If as explained above a protruding of the fastener is not desired it must be taken care that sufficient space is provided for the engagement of the driver. If an insert is used the space between the shank and the wall of the bore is automatically larger. If, however, the fastener is directly threaded into the bore, the bore preferably has an enlarged portion at the end opposite to the fastener head so as to allow engagement of the screw driver.

The hole in the support member preferably has the shape of a keyhole with the smaller portion being below the larger one.

The fastener assembly according to the invention allows a pre-assembling of the first member with the threaded fastener so that the final assembling can be carried out within the shortest time. The portion of the shank which is free of a thread adjacent to the head thus cannot be damaged which would not allow an assembling or a threading. For example, the fastener shank can have a clearance with respect to the wall of the hole in order to allow the precise positioning of the member. The fastener assembly according to the invention for example allows the attachment of the housing of an airbag sensor to the column such that unnecessarily protruding parts are avoided. The fastener assembly according to the invention is extremely simple in structure. A simple threaded fastener is used only having the particularity that the end of the shank is provided with engagement surfaces for a tool. A nut which normally is used for the screw attachment is not necessary.

BRIEF DESCRIPTION OF THE DRAWINGS

Various other objects, features, and attendant advantages of the present invention will be more fully appreciated from the following detailed description of the invention when taken in connection with the accompanying drawings, in which like reference characters designate like or corresponding parts throughout the several views, and wherein.

DETAILED DESCRIPTION OF THE INVENTION

Figures 1, 2:
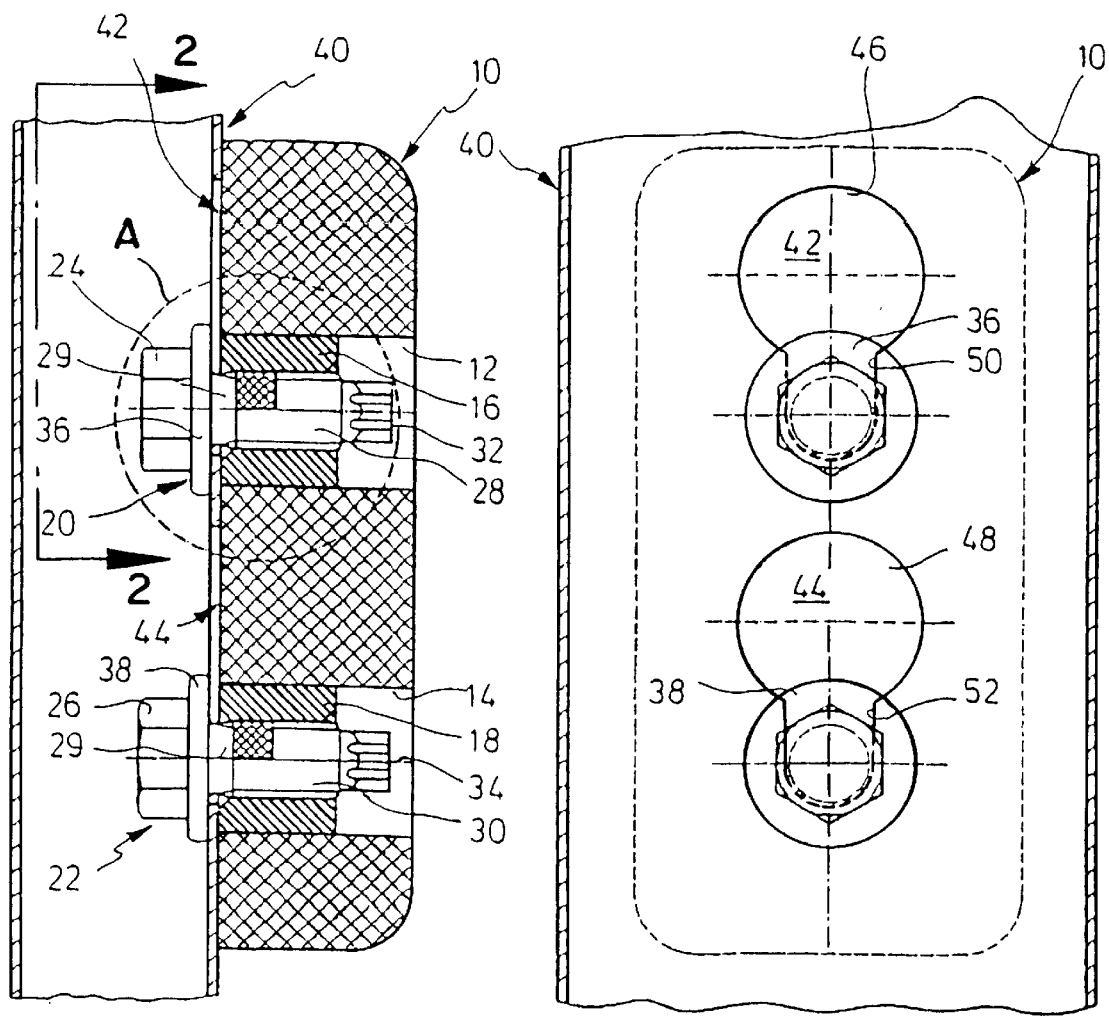
FIG. 1 is a cross section through an attachment of an airbag sensor to a column of the body of an automotive vehicle.
FIG. 2 is a view of the assembly of FIG. 1 in the direction of lines 2—2.

By cross hatching in FIG. 1 the housing 10 of an airbag sensor is indicated. The housing 10 has two through-bores 12, 14 into which inserts 16 and 18 are inserted by an interference fit. The inserts 16, 18 have an inner thread.

Threaded fasteners 20, 22 are provided with a head 24, 26, threaded shanks 28, 30 and ends 32, 34. The threaded shank 28, 30 are threaded into the inner threads of the inserts 16, 18. The ends 32, 34 of the shanks 28, 30 each have a Torx-portion. The heads 24, 26 have integrally formed radial flanges 36, 38. A non-threaded portion 29 joins the heads 24, 26.

A column 40 of a body of an automotive vehicle, not shown in detail, is hollow and formed of sheet material. At the inner side the column 10 has two holes 42, 44 in vertical alignment. The holes 42, 44 are shaped like a keyhole with an upper circular larger portion 46, 48 and a smaller portion 50, 52 below the larger portion 46, 48. The larger portion 46, 48 is so dimensioned that the head 24, 26 with flange 36, 38 can be inserted. The smaller portion 50, 52 is dimensioned such that the flange 36, 38 may grip behind the edge of the hole 42, 44 as can be seen in FIGS. 1 and 2.

Figure 3:
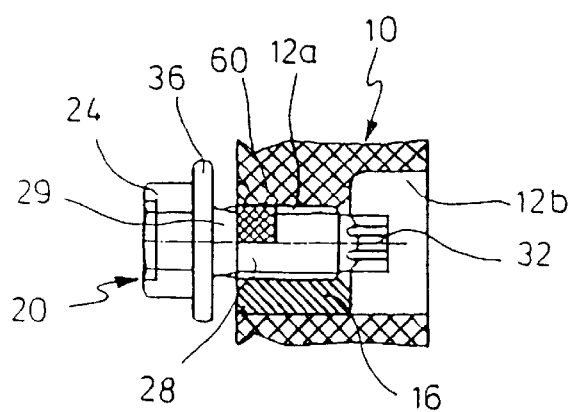
FIG. 3 is a detailed view of the region A B of FIG. 1 without the column and showing a pre-assembled condition of the sensor housing with a threaded fastener.

In FIG. 3 two different embodiments are to be seen. In the lower portion of FIG. 3 the illustration corresponds to that of FIG. 1. In the upper portion of FIG. 3 the insert 16 is omitted. Rather, bore 12a has an inner thread into which the threaded shank 28 is threaded immediately. In order to allow the engagement of a screw driver with the Torx-portion 32 in FIG. 3 the bore 12a is provided with an enlarged portion 12b. In FIG. 3 it can be finally seen that the fastener 20 has a pre-assembled position wherein flange 36 is spaced a distance from the associated surface of the housing 10, the distance being somewhat larger than the thickness of the sheet material into which the holes 42, 44 are formed. The shank is partially provided with a plastic coating 60 which allows the fastener 20 to remain in the pre-assembled position. The coating 60 not only secures the pre-assembled state, but also locks the screw when finally tightened as shown in FIG. 1.

The shank 28 for example has a left hand thread so that during pre-assembling the fastener is threaded into bore 12 by a left hand screw driver. In the pre-assembled state the sensor housing 10 is brought against column 40 with the heads 24, 26 inserted through the larger portion 46, 48 of holes 42, 44. Then the housing can be released so that the shank 28, 30 enters the smaller portion 50, 52 of hole 42, 44, and flange 36, 38 grips behind the edge of the hole. Now the fastener 20, 22 can be tightened by a right hand screw driver in order to attach the housing 10 tightly to column 40. The end of the shaft does not project beyond the housing so that damage to the safety belt does not occur.

Obviously, many modifications and variations of the present invention are possible in light of the above teachings. It is therefore to be understood that within the scope of the appended claims, the present invention may be practiced otherwise than as specifically described herein.

What is claimed is:

1. A fastening assembly, comprising:
    a first member having at least one threaded bore defined therein, and a first engagement surface;
    at least one threaded fastener having a head at a first end thereof, and a threaded shank connected at a first end thereof to said head and having a second opposite end which has means thereon for engaging a rotary tool, said at least one threaded fastener being disposed within said at least one threaded bore of said first member as a result of threaded engagement of said threaded shank of said at least one threaded fastener with said at least one threaded bore of said first member whereby said head of said at least one threaded fastener is separated from said first engagement surface of said first member so as to define a space therebetween; and
    a second member comprising a panel having first and second engagement surfaces and at least one elongated opening having a first larger portion for accommodating said head of said at least one threaded fastener, and a second smaller portion for accommodating said threaded shank of said at least one threaded fastener so as to permit said second member panel to be disposed within said space defined between said head of said at least one threaded fastener and said first engagement surface of said first member when said head of said at least one threaded fastener is initially inserted through said first larger portion of said at least one elongated opening of said second member and when said first end of said threaded shank is subsequently moved from said first larger portion of said at least one elongated opening of said second member and into said second smaller portion of said at least one elongated opening of said second member, whereby when said at least one threaded fastener is subsequently tightened as a result of rotary engagement of a rotary tool with said second opposite end of said at least one threaded fastener, said head of said at least one threaded fastener will be engaged with said first engagement surface of said second member while said second engagement surface of said second member will be engaged with said first engagement surface of said first member.

2. A fastener assembly as set forth in claim 1, wherein:
    said threaded shank of said at least one threaded fastener has a left-hand thread provided thereon.

3. A fastener assembly as set forth in claim 1, comprising:
    insert means fixedly disposed within said first member and having an internal thread defined therein so as to define said at least one threaded bore within said first member.

4. A fastener assembly as set forth in claim 3, wherein:
    said insert means is fixedly disposed within said first member by an interference fit.

5. A fastener assembly as set forth in claim 1, further comprising:
    coating means disposed upon said threaded shank of said at least one threaded fastener for increasing adherence of said at least one threaded fastener within said at least one threaded bore of said first member.

6. A fastener assembly as set forth in claim 1, wherein:
    said head of said at least one threaded fastener has means for engaging a rotary tool which comprises external hexagonal facets defined upon said head.

7. A fastener assembly as set forth in claim 1, wherein:
    said first member has two threaded bores defined therein;
    said second member has two elongated openings defined therein; and
    said at least one threaded fastener comprises two threaded fasteners respectively threadedly engaged within said two threaded bores of said first member.

8. A fastener assembly as set forth in claim 1, wherein:
    said first member comprises an automotive airbag sensor; and
    said second member comprises an automotive support panel.

9. A fastener assembly as set forth in claim 7, wherein:
    said elongated openings of said second member have substantially keyhole configurations which define said first larger and second smaller portions thereof.

10. A fastener assembly as set forth in claim 1, wherein:
    said second member comprises a hollow portion; and
    said head of said at least one threaded fastener is disposed internally within said hollow portion of said second member while said second end of said at least one threaded fastener is disposed internally within said at least one threaded bore of said first member such that said head and second end portions of said at least one threaded fastener do not project, externally of said first and second members.

11. A method of assembling, comprising the steps of:
    providing a first member with at least one threaded bore and a first engagement surface;

pre-assembling at least one threaded fastener, having a head and a threaded shank connected at a first end thereof to said head and having a second opposite end, within said at least one threaded bore of said first member as a result of threaded engagement of said at least one threaded fastener within said at least one threaded bore of said first member such that said head of said at least one threaded fastener is separated from said first engagement surface of said first member so as to define a space therebetween;

providing a second member comprising a panel with first and second engagement surfaces and at least one elongated opening having a first larger portion for accommodating said head of said at least one threaded fastener, and a second smaller portion for accommodating said threaded shank of said at least one threaded fastener;

inserting said head of said at least one threaded fastener through said first larger portion of said at least one elongated opening of said second member panel;

moving said at least one threaded fastener and said first member relative to said second member such that said first end of said threaded shank of said at least one threaded fastener is moved from said first larger portion of said at least one elongated opening of said second member and into said second smaller portion of said at least one elongated opening of said second member, and said panel of said second member is disposed within said space defined between said head of said at least one threaded fastener and said first engagement surface of said first member; and threadedly tighteneing said at least one threaded fastener within said at least one threaded bore of said first member such that said head of said at least one threaded fastener will be engaged with said first engagement surface of said second member while said second engagement surface of said second member will be engaged with said first engagement surface of said first member.

12. A method as set forth in claim 11, wherein:

said threaded shank of said at least one threaded fastener is provided with a left-hand thread.

13. A method as set forth in claim 12, further comprising the steps of:

threadedly engaging said at least one threaded fastener within said at least one threaded bore of said first member, during said pre-assembling step, from said second end of said at least one threaded fastener by means of a left-hand drive; and threadedly engaging said at least one threaded fastener within said at least one threaded bore of said first member, during said tightening step, by said head of said at least one threaded fastener by means of right-hand drive.

14. A method as set forth in claim 13, wherein:

said head of said at least one threaded fastener has a hexagonal external configuration so as to facilitate said threaded engagement of said at least one threaded fastener within said at least one threaded bore of said first member.

15. A method as set forth in claim 11, further comprising the step of:

providing an internally threaded insert within said first member so as to define said at least one threaded bore within said first member.

16. A method as set forth in claim 15, further comprising the step of:

fixedly disposing said threaded insert within said first member by an interference fit.

17. A method as set forth in claim 11, further comprising the step of:

providing a coating upon said threaded shank of said at least one threaded fastener for increasing the adherence of said at least one threaded fastener within said at least one threaded bore of said first member.

18. A method as set forth in claim 11, further comprising the steps of:

providing said first member with two threaded bores;

providing said second member with two elongated openings; and threadedly engaging two threaded fasteners within said two threaded bores of said first member.

19. A method as set forth in claim 11, wherein:

said first member comprises an automotive airbag sensor; and said second member comprises an automotive support panel.

20. A method as set forth in claim 11, wherein:

said at least one elongated opening of said second member has a substantially keyhole configuration defining said first larger and second smaller portions thereof.

* * * * *